United States Patent [19]

Dillow

[11] 4,177,596
[45] Dec. 11, 1979

[54] APPENDAGE FOR A FISHHOOK

[76] Inventor: John P. Dillow, 1906 Springbranch, Arlington, Tex.

[21] Appl. No.: 879,243

[22] Filed: Feb. 21, 1978

[51] Int. Cl.² ........................................... A01K 83/02
[52] U.S. Cl. ....................................... 43/36; 43/43.4
[58] Field of Search ............ 43/34, 35, 36, 37, 43.16, 43/43.4, 43.6

[56] References Cited

U.S. PATENT DOCUMENTS

| 2,148,074 | 2/1939 | Kaspick | 43/36 X |
| 2,570,468 | 10/1951 | Matthes | 43/43.16 X |
| 2,592,727 | 4/1952 | Pamer | 43/36 |
| 3,006,101 | 10/1961 | Zeman | 43/36 |

Primary Examiner—Nicholas P. Godici
Attorney, Agent, or Firm—Charles W. McHugh

[57] ABSTRACT

An appendage for a fishhook, with the fishhook having a shank and the shank having a bight at one end and an eye at its other end. The appendage includes an anchor member which is attached to the shank near the eye. At least one torsion member (and typically two) extends transversely from the anchor member near the eye. A latch post also extends transversely from the anchor element at a point remote from the torsion member. An arm is connected in a cantilevered fashion to the distal end of each torsion member. The arm has two normal positions: a relaxed position wherein it makes an angle of at least 15 degrees with respect to the shank, and a "cocked" position wherein it lies more nearly parallel to the shank. The arm is held in its cocked position by temporary engagement with the distal end of its associated latch post. When the arm is manually moved from its relaxed position to its cocked position, torsion is imparted to the torsion member; and, when a fish swallows the baited hook, the arm is released from the latch post and it is urged by the torsion member back to its relaxed position—making it much more difficult for the fish to expel the hook from its mouth. A preferred material for the appendage is a thermoplastic material such as a polyester elastomer.

21 Claims, 11 Drawing Figures

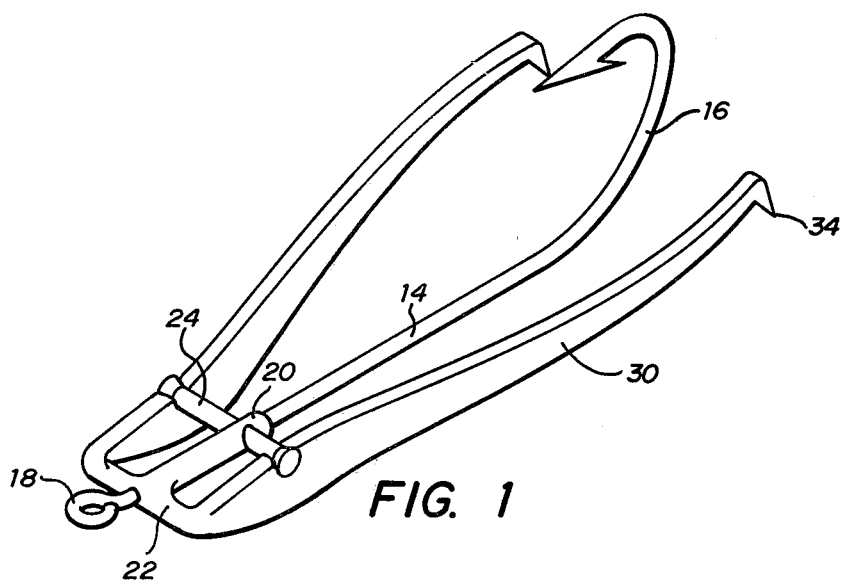
FIG. 1
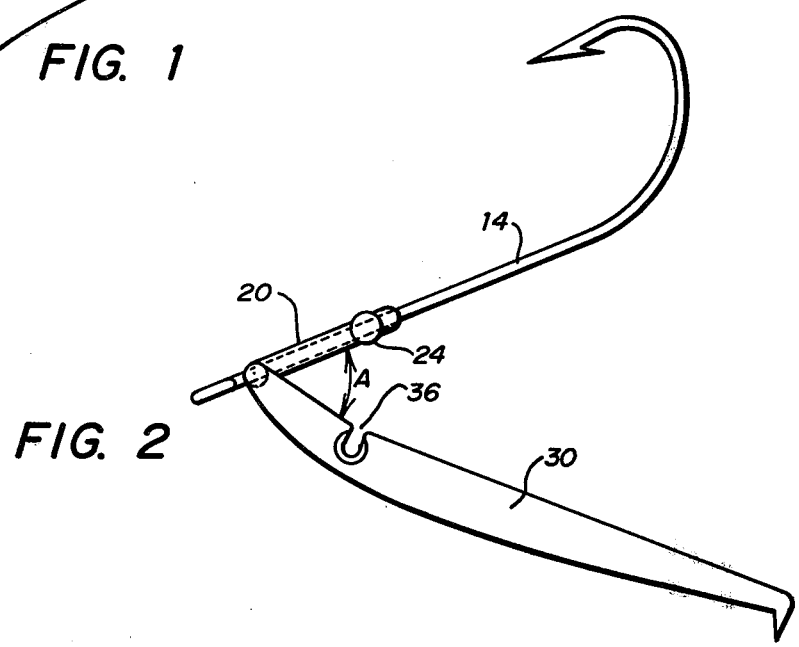
FIG. 2
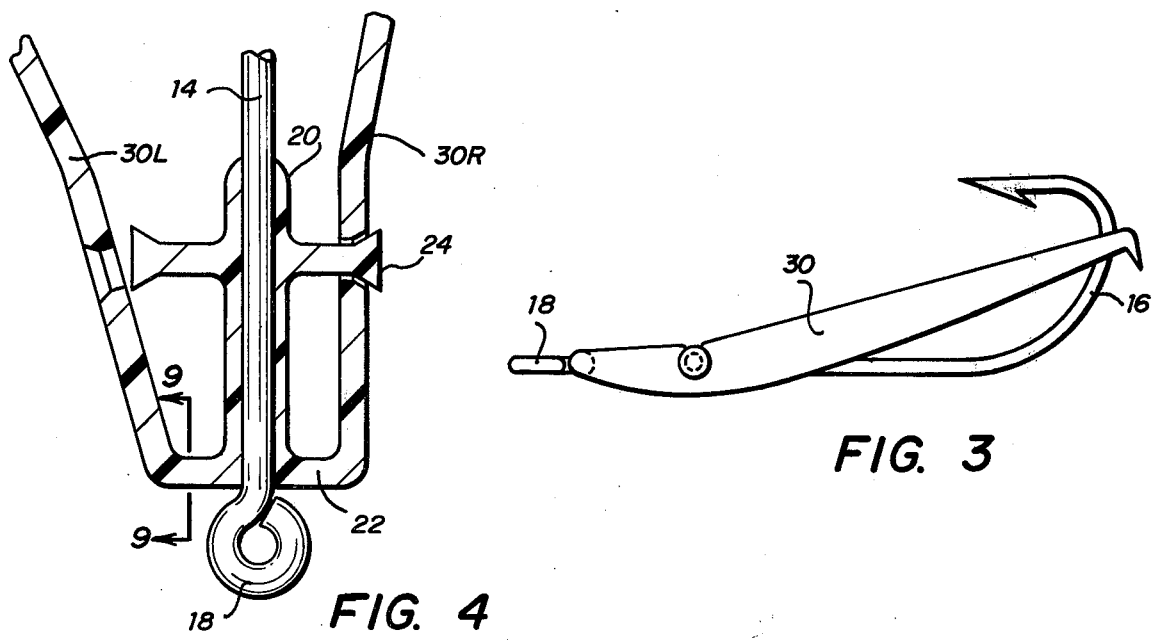
FIG. 4
FIG. 3

APPENDAGE FOR A FISHHOOK

This invention relates generally to fishhooks, and more particularly it relates to an appendage which operates to spring open and securely hold a hook in the mouth of a fish.

The art of catching fish with a line and a hook has long been practiced throughout the world; but, in spite of the number of years that people have been practicing their fishing skill, there seemingly has not been any perceptible decrease in the number of stories about "the one that got away". And, this appears to be true in spite of the fact that there have been numerous efforts to make the odds of catching a fish more clearly in favor of the fisherman, especially when the fish is at least enticed to strike at the bait. One of the difficulties experienced by many fisherman is that a fish may firmly bite at a baited hook and subsequently perform some action or motion which causes the hook to be expelled from the fish's mouth. To perhaps reduce these frustrating incidences, there have been efforts to render the setting of the fishhook within a fish's mouth an essentially automatic operation, and many inventions have been proposed which serve to jerk a line (and the attached hook) upward when a fish hits at the bait. Examples of this type of apparatus are shown in U.S. Pat. No. 2,694,875 to Hoffmann and U.S. Pat. No. 2,858,634 to Bremer. A different concept omits any apparatus which moves the hook upward, and instead acts to change the inclination of the hook after it has been hit by a fish. Exemplary of this type of device is that shown in U.S. Pat. No. 2,592,727 to Pamer.

While the Pamer "Automatic Fishhook" would appear to offer significant advantages over line-jerking devices, it is believed that there are also some potential difficulties with a construction as illustrated by Pamer. For example, with his spring member extending as far as it must in the direction of the hook's pointed end (in order to have the desired "trigger action"), there is a distinct possibility that any sort of firm bait on the hook might hold the spring member in place and preclude it from releasing at the desired time. Too, if a fisherman should attempt to put a live bait on a Pamer hook, the proximity of the spring extension to the point makes it vulnerable to being tripped by any movement of the bait on the hook. Furthermore, it appears that there is a risk of accidentally releasing the spring extension if a Pamer hook should be pulled vigorously through any area where there are submerged bushes or weeds. Thus, while it is believed that the Pamer concept has more inherent worth as far as improving the chances of catching a fish, it is believed that there is still room for improvement in causing a fishhook to be firmly set in a fish's mouth. Accordingly, it is an object of this invention to provide an improved fishhook using a concept suggested by Pamer, but doing so in an unobvious manner. In particular, it is an object to increase the number of fish that are actually put on a stringer by virtue of adding an appendage to most any conventional fishhook.

It is a further object to provide an appendage having a spring-loaded arm which supplements the natural action of a conventional fishhook with regard to keeping a fish on the line after it has swallowed a hook.

Still another object is to provide a improved fishhook which is adapted for using live baits (such a minnows or perch, etc. ) without risking premature tripping of a spring-biased arm.

These and other objects will be apparent from a careful reading of the specification and the claims appended thereto, and from a review of a drawing attached hereto in which:

FIG. 1 is a perspective view of an appendage according to the invention wherein two arms are employed and the appendage is molded as a unit around a conventional fishhook;

FIG. 2 is a side elevational view of an embodiment like that shown in FIG. 1, wherein the arms are shown in a typical relaxed position such as they might have before any torsion is imparted to a torsion member;

FIG. 3 is a side elevational view of the same combination which is shown in FIG. 2, wherein both of the cantilevered arms are moved to a "cocked" position where they will remain until a fish swallows the hook;

FIG. 4 is a fragmentary top view of that portion of the assembly shown in FIG. 1 which is near the eye of the hook;

Figure 5:
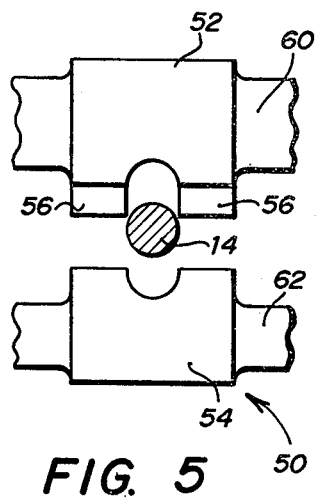
FIG. 5 is a fragmentary, elevational view of another embodiment of the invention, looking longitudinally of the shank of a fishhook, with the anchor pieces being shown in a separated position—such as they might have immediately prior to assembly.

In brief, this invention includes an appendage for a fishhook, which typically will be a conventional fishhook having a shank with a bight at one end and an eye at its other end. The appendage includes an anchor member which is adapted to encompass at least a portion of the shank near the hook's eye. At least one torsion member (and normally two) extends transversely from that end of the anchor element which is closer to the eye. The torsion member(s) will also usually lie in a plane which is approximately perpendicular to the plane which is defined by the shank and the bight of the hook. A latch post extends transversely from near the second end of the anchor element, and it lies in approximately the same plane as the torsion member. An arm which is connected in a cantilevered fashion to the distal end of the torsion member has two normal positions: a relaxed position and a cocked position. When the arm and its associated torsion member are relaxed, said arm extends downwardly so that it makes an angle of at least 15 degrees with respect to the hook's shank. When the arm is moved upward to its cocked position and the torsion member is thereby twisted, said arm will be more nearly parallel to and lie alongside the shank. An arm is held in its cocked position by temporarily engaging some part of the arm with the distal end of a latch post. The engagement of an arm and its associated latch post is designed such that the action of a fish in swallowing the hook will cause the arm to be released—whereby the arm will be urged by the torsion member to return to its relaxed position, making it more difficult for the fish to expel the hook.

The appendage disclosed herein may be attached to a conventional fishhook through a technique involving injection molding of a thermoplastic material such as a polyester elastomer. In another manufacturing technique, the two-piece anchor member is bonded around the shank of a fishhook using ultrasonic welding, etc. A preferred material for the appendage is a thermoplastic resin having properties similar to those of a resin marketed by DuPont under the trademark Hytrel.

Referring initially to FIG. 1, an appendage 10 is shown attached to a conventional fishhook 12 which has a shank 14 with a bight 16 at one end and an eye 18 at its other end. The appendage 10 includes an anchor member 20 which is adapted to encompass at least a portion of the shank 14, with said anchor member having a first end near the hook's eye and a second end between the eye and the bight. In a preferred embodiment, the anchor member 20 is molded around a conventional fishhook (as by injection molding) in such a way as to be permanently locked to the fishhook. Typically, the anchor member 20 will be almost cylindrical so as to be economical of material which surrounds a generally cylindrical shank 14. And, as illustrated in FIG. 1, it typically extends from the eye 18 toward the bight 16 for a distance of about ½ or ¼ of the length of the shank 14. Also, the anchor member 20 ideally encompassed at least some irregular portion of a shank 14, so that said anchor will not rotate with respect to the shank in an unwanted fashion. It is also desirable that the anchor element 20 be fixed so that it does not slide with respect to the shank in a longitudinal direction.

Extending transversely from near the first end of the anchor member 20 is a torsion member 22 which lies in a plane that is approximately perpendicular to the plane formed by the shank 14 and the bight 16 of the hook. While it will be perhaps more readily apparent hereinafter that a single torsion member (and its associated pieces) would suffice for practicing the invention, it is definitely preferred that there be at least two co-planar torsion members, with one torsion member extending radially outward to one side of the hook and the other torsion member extending outwardly in the opposite direction.

At the second end of the anchor member 20 is what will be referred to herein as a latch post 24; the post extends transversely outward and lies in approximately the same plane as the torsion member 22. In one form of the latch post 24, a bulbous portion is provided at the distal end of said latch post; and, in a preferred form, the distal end constitutes a frustoconical section, with the narrow portion of said section being closer to the shank than the wider portion. The length of the latch post 24 and the exact configuration of its distal end will be treated more thoroughly herein with reference to a cooperating part of the appendage.

Connected to the distal end of each of the torsion members is a reasonably rigid arm 30. Each of the two arms shown in FIG. 1 is securely connected in a cantilevered fashion to its respective torsion member 22 at an angle so that the arm extends generally downward with respect to the hook's shank when the torsion member is in its relaxed mode. Preferably, this angle A is at least 15 degrees, and may be as much as 60 degrees, although about 30 to 45 degrees appears to offer optimum results—considering endurance of the materials which are employed as well as the opportunity to catch fish. As shown in FIG. 2, the angle A is measured in a plane which is parallel to the plane of the hook's shank and bight.

Turning additionally to FIG. 3, the arm 30 has a second or "cocked" position in which it lies nearly alongside the shank 14 when the torsion member 22 is twisted. There is also provided a means for temporarily engaging the distal end of the latch post 24 and the arm 30 when said arm is twisted to a postion alongside the shank. This means is intended to be releasable under the influence of a fish biting at a baited hook and squeezing on the appendage, whereby the arm will be released and urged by torsion member 22 to an extended position (as in FIG. 2) which will make it more difficult for the fish to expel the hook. To enhance the action of an arm 30, there is provided a downwardly projecting point 34 at the distal end of each arm, with said point extending in a direction opposite to the bight in the hook 12.

One embodiment of the means for temporarily engaging a latch post and an associated arm comprises a bulbous portion at the distal end of a latch post 24, and a groove 36 in the arm 30, with said groove having a size and being positioned so as to be wedged underneath the bulbous portion of the latch post when said arm is twisted to a cocked position. As may perhaps be best seen in FIG. 2, a suitable groove 36 extends transversely about half-way through the arm 30; but the remaining material in the arm opposite said groove should be greater than the width of the arm in the region immediately adjacent the torsion member 22—so that moving the arm to its cocked position will typically distort the torsion member but will not distort the arm. That is, when the arm is moved from a configuration shown in FIG. 2 to a configuration like that shown in FIG. 3, it is preferred that all of the torsion be absorbed in the torsion member 22, while the arm 30 remains substantially undistorted.

Referring next to FIG. 4, an embodiment having two sets of cooperating elements is shown, including two torsion members, two latch posts, and two arms; the first and second sets of elements are symmetrically positioned with respect to the shank 14 on opposite sides thereof. However, the first set of cooperating elements (on the right side of the hook) is shown in its disengaged position (corresponding to FIG. 2). It will be seen that the left arm 30L makes an angle of about 15 degrees with respect to the plane defined by the hook's shank and bight; hence, the arm 30L must be pressed inwardly by about 15 degrees in order to lie more nearly parallel to the hook's shank when the appendage is cocked. The extent of the difference between the two normal positions of an arm, i.e., the extent to which it must be squeezed inward in order to engage a latch post, will naturally have some impact on how tightly an arm 30 will be held by its associated latch post 24. In other words, the sensitivity of the holding means or "trigger action" of the appendage 10 will be based at least in part on how much deformation is designed into the arm 30 as it is moved to its cocked position.

While it would be possible for at least some of the members which make up a set of cooperating elements to be assembled from various pieces, it is preferred that the anchor member 20, the torsion members 22, the latch posts 24, and the arms 30 all be integrally formed from a non-rusting, thermoformed plastic—such as nylon, Delrin, Hytrel, etc. As a class, polyester elastomers are believed to be ideal materials for the appendage described herein; such elastomers have the requisite resilience, toughness and strength of withstand all of the adverse conditions which might be anticipated for a device of this nature. The preferred polyester elastomer is a resin available from DuPont under the trademark Hytrel.

Figure 6:
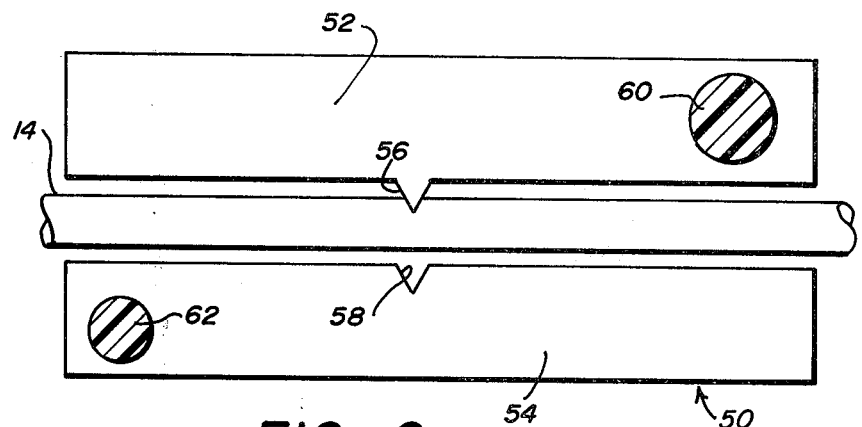
FIG. 6 is a side view of the embodiment shown in FIG. 5.

While it is definitely advantageous to mold an appendage of the type described herein around a fishhook, it would certainly be conceivable to prepare a separate appendage and subsequently attach it to a hook at any desired time. Such an embodiment is shown in FIGS. 5 and 6, wherein a central groove is provided in the anchor portion—with said groove having a size which is adapted to receive and snuggly hold the shank of a common fishhook. The embodiment shown in FIGS. 5 and 6 is particularly adapted for being assembled from separate pieces that are joined—as by ultrasonic welding—into a unitary appendage. The top member 52 of such an assembly 50 has a lower surface which mates with the upper surface of member 54, with the fishhook shank 14 being captured between the two juxtaposed surfaces. To insure proper alignment of the pieces 52, 54 as they are being brought together, a protuberance 56 on upper member 52 is sized to mate with a recess 58 on lower member 54.

It may also be seen in FIG. 6 that the cross-section of the latch post 60 is substantially larger than the cross-section of torsion member 62, in order that the larger latch post will have greater rigidity. Thus, when an arm is twisted about an axis coincident with torsion member 62, the relatively large latch post 60 will constitute a firm and unyielding anchor point. Also, it should perhaps be pointed out that the horizontal planes occupied by the latch post 60 and torsion member 62 have been moved slightly apart, so that they are not in the exact plane of the shank 14; but they are still sufficiently aligned as to be capable of cooperating in holding an arm in a cocked position.

Figure 7:
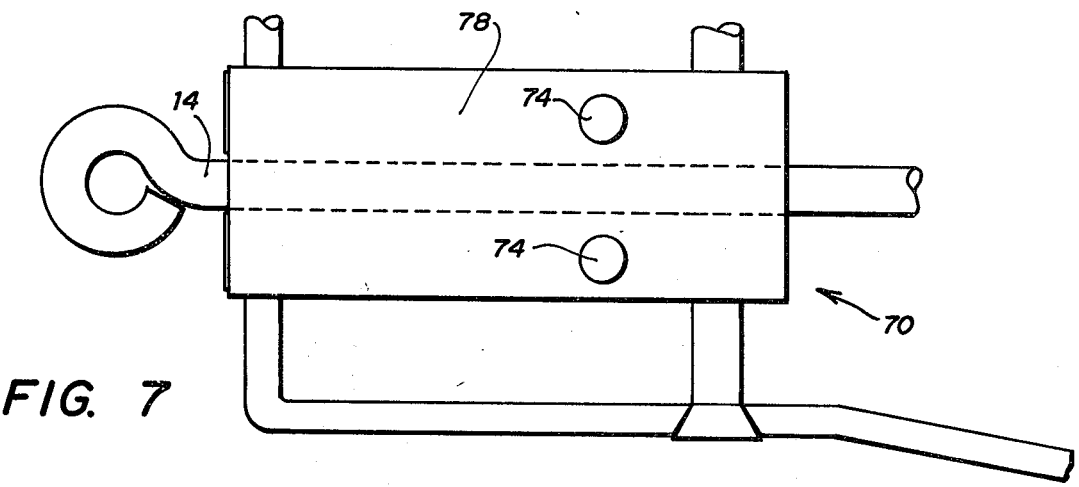
FIG. 7 is a side elevational view of another embodiment of the invention wherein two portions of an anchor member are hingedly connected at one end, with the shank of a fishhook being positioned within the unlatched appendage.
Figure 8:
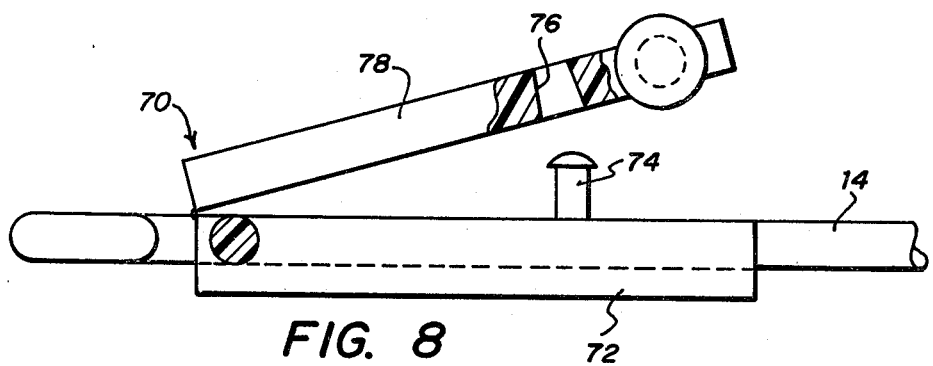
FIG. 8 is a fragmentary, top view of the embodiment shown in FIG. 7, with the appendage being rigidly latched onto the fishhook.

Referring next to FIGS. 7 and 8, another embodiment of the invention is presented wherein an appendage 70 has a configuration which permits a fisherman to attach the appendage to any conventional fishhook while he is in a remote location and has no elaborate tools at his disposal. In this embodiment, a lower anchor element 72 has an upwardly protruding post 74 which is designed to securely mate with a suitable recess 76 in upper member 78. Proper alignment of post 74 and recess 76 is insured by virtue of the hinged connection between the two elements 72, 78—which preferably is a so-called "living" hinge at one end of the anchor member. This embodiment, which could be put on essentially any fishhook at nearly any time, may be preferred by those fisherman who like to make their own "flies" by decorating a hook with personally selected feathers and the like. Of course, any of the hook-setting appendages described herein may be first applied to the fishhook and then camouflaging skirts or feathers may be subsequently added to help conceal the appendage.

Figure 9:
FIG. 9 is a cross-sectional view taken transversely of an exemplary torsion member.
Figure 10:
FIGS. 10 and 11 are cross-sectional views (taken transversely) of two other embodiments of torsion members according to the invention.
Figure 11:

Regardless of which of the attaching techniques disclosed herein is employed for combining an appendage with a fishhook, there are some parameters of the appendage which will likely remain essentially constant. For example, the preferred length of a snap arm 30 will usually be about 80 percent of the overall length of the fishhook 12 to which it is applied. Depending on the size of the hood (e.g., from No. 10/0 to 8), the length of a given torsion member 22 will typically range from about 0.10 inch to about 0.40 inch. And, the length of a latch post associated with a given torsion member will typically exceed the length of said torsion member by approximately 1/10 inch. As for relatively large hooks, it may be desirable to utilize a torsion member whose cross-section is not cylindrical or uniform, and a couple of exemplary cross-sections are shown in FIGS. 9 and 10, with the cross-section in FIG. 9 being more appropriate for a small hook and the cross-section of FIG. 10 being more appropriate for a large hook.

In use of an embodiment of the invention having two arms which constitute mirror images of each other (such as the embodiment shown in FIG. 1), a fisherman would be expected to remove an assemblage from his tackle box with the arms 30 extending downward and the torsion members 22 being relaxed. The fisherman would then bait his hook in a conventional manner with a live bait or some artificial or specially prepared material, etc. With the bait securely in place, the arms 30 would be pressed inward slightly and rotated upward until the grooves 36 engage their respective latch post 24. When a fisherman relaxes his grip on a cocked arm 30, it will be held in place only by the abutting portions of the arm and its latch post 24; and the resilience in torsion member 22 (keeping an outwardly directed force on the arm) will generally insure that the arm stays cocked. The baited hook can then be put in the water in a conventional manner where, hopefully, it will soon attract the attention of an interested fish. If the fish is merely curious and pushes or bumps against the baited combination, nothing will happen—because a compressive force is required in order to release a cocked arm 30. That is, pushing radially inward against an arm 30 should have no effect—unless the remainder of the apparatus is restrained in some way, so that the pushing accomplishes relative movement between the shank and the distal portion of an arm. Such compression can be realized, of course, if the fish swallows the hook, because the sides of the fish's mouth will serve to move the arm inwardly by that small distance which is necessary to release the arm from its engagement with a latch post 24. In the dual-arm embodiment of FIG. 1, either one of the arms 30 may be independently released, depending upon how the bait enters the fish's mouth and in which direction a greater compressive force is exerted. If either one or both of the arms have been released from their associated latch posts 24, the torsion in a member 22 will immediately act to cause the arm to spring outward, thereby causing the hook to be forced more securely into the fish's mouth and thwarting efforts by the fish to dislodge the hook. While the open or relaxed position of the arms 30 may be sufficient to help hold the hook in place simply by virtue of pushing against the hook, the downwardly pointed tips 34 enhance the wedging and holding action of the combination within a fish's mouth.

Perhaps it should be mentioned also that the "spring" action of the individual torsion members comes into being just as soon as an arm is pushed inwardly with respect to a holding means. Thus, the fish will be more likely to be thoroughly hooked in the mouth and not at a deeper location, as in the throat. This should be particularly beneficial with regard to any undersize fish that might be caught on the combination disclosed herein. By facilitating the hooking of a fish in the mouth, it is easier for a fisherman to reach the hook and dislodge it without doing an inordinate amount of damage to the fish. Hence, an undersize fish can be expeditiously removed from the hook and thrown back—with relatively little harm to the fish. But for those fish that the fisherman definitely wants to catch, the appendage shown and described herein should help keep the fish on the line for a longer period of time.

An additional advantage of the appendage described herein is that the two arms 30 can be utilized to effectively "cradle" a bait around a fishhook. To the extent that the thin arms 30 preclude the bait from becoming dislodged, they serve to protect the bait; too, they more nearly promote an aggressive attack by a fish (instead of the frustrating "nibbling" which often occurs), in order for the fish to get at the last piece of bait that may be left between the hook and an arm. In other words, the structure shown herein more nearly insures that the fish will bite—not nibble—at the combination.

In addition to the previously mentioned thermoplastic resins as suitable materials for the various components of the appendage 10, there may be some situations where it would be expedient to substitute metal for the preferred synthetic resins. If economics or the availability of plastics should make the substitution of metal advantageous, the arms 30 obviously constitute the largest parts of the appendage, and a substantial reduction in the necessary plastic would be achieved if the arms were made of metal. Of course, the manufacturing steps are simplified if the appendage 10 is cast as a unitary device; and the ability of certain plastic resins to be repeatedly subjected to 90 degree twists and then spring back to their relaxed positions definitely makes plastics worthy of serious consideration in the material selection process.

While only a few embodiments of the invention have been described herein in great detail, it should be apparent to those skilled in the art that modifications thereof can be readily accomplished without departing from the spirit and scope of the invention. Accordingly, the invention should be understood to be limited only by the claims appended hereto.

I claim:

1. An appendage for combination with a fishhook having a shank with a bight at one end and an eye at its other end, comprising:
   (a) an anchor member adapted to encompass at least a portion of the shank, and said anchor element having a first end near the hook's eye and a second end between the eye and the bight;
   (b) a torsion member extending transversely from near the first end of said anchor element and lying in a plane which is approximately perpendicular to the plane formed by the shank and bight of the hook;
   (c) a latch post extending transversely from near the second end of said anchor element and lying in approximately the same plane as the torsion member;
   (d) an arm which is connected in a cantilevered fashion to the distal end of the torsion member, and said arm extending downward so that it makes an angle of at least 15° with respect to the hook's shank when the torsion member is in its relaxed mode, with said angle being measured in a plane which is parallel to the plane of the hook's shank and bight, and said arm being almost parallel to and lying alongside of the shank when the torsion member is twisted; and
   (e) means for temporarily engaging the distal end of the latch post and the arm when said arm is twisted to a position alongside the shank, and said means being releaseable under the influence of a fish biting on the appendage, whereby the arm will be urged by the torsion member to an extended position which will make it more difficult for the fish to expel the hook.

2. The appendage as claimed in claim 1 and further including a set of elements comprising a second torsion member, a second latch post, and a second arm, with the first set of elements extending outwardly from the anchor member on one side thereof and the second set of elements extending outwardly from the anchor member on the other side thereof, and said first and second sets of elements being symmetrically positioned with respect to the shank.

3. The appendage as claimed in claim 1 and further including a downwardly projecting point at the distal end of said arm, with said point extending in a direction opposite to the bight in the hook.

4. The appendage as claimed in claim 1 wherein the anchor member, the torsion member, the latch post and the arm are integrally formed.

5. The appendage as claimed in claim 1 wherein the appendage is injection molded around a fishhook in such a way as to be permanently locked thereto.

6. The appendage as claimed in claim 5 wherein at least a portion of the anchor member encompasses a non-uniform portion of the hook, whereby said appendage may not be rotated with respect to the longitudinal axis of the shank.

7. The appendage as claimed in claim 1 wherein the means for temporarily engaging the latch post and the arm comprises a bulbous portion at the distal end of the latch post and a groove in said arm, with said groove being positioned so as to be wedged underneath the bulbous portion of the latch post when said arm is twisted to a cocked position.

8. The appendage as claimed in claim 7 wherein the groove extends transversely about halfway through said arm, and the remaining material in said arm opposite said groove is greater than that portion of the arm immediately adjacent the torsion member, whereby moving said arm to its cocked position will distort said torsion member but not distort said arm.

9. The appendage as claimed in claim 1 wherein the arm additionally makes an angle of several degrees with respect to the plane of the hook's shank and bight when the arm is in its relaxed mode, whereby the arm must be pressed inwardly by several degrees in order to lie almost parallel to the hook's shank when the appendage is cocked.

10. The appendage as claimed in claim 1 wherein the cross-sectional area of the arm between the torsion member and the latch post is substantially greater than the cross-sectional area of the torsion member, whereby moving the arm to a cocked position causes essentially all of the torsion to be absorbed in said torsion member.

11. The appendage as claimed in claim 1 wherein the relaxed position of said torsion member is such as to cause the arm to extend downwardly away from the hook by an angle of approximately 45°.

12. The appendage as claimed in claim 1 wherein the length of the arm is such that the distal end thereof extends at least as far as the most extreme portion of the hook's bight.

13. The appendage as claimed in claim 1 wherein the anchor member extends from the eye toward the bight for a distance of about ⅓ the length of said shank.

14. The appendage as claimed in claim 1 wherein the distal end of said latch post constitutes a frustoconical section with the narrow portion of said section being closer to the shank than the wider portion.

15. The appendage as claimed in claim 1 wherein the arm extends both outwardly and downwardly from the hook when said arm is in its relaxed mode, whereby releasing said arm from its cocked position will cause the arm to move both outwardly and downwardly with respect to the hook.

16. The appendage as claimed in claim 1 wherein the anchor member, the torsion member, the latch post and the arm are molded of a non-rusting thermoplastic material.

17. The appendage as claimed in claim 1 wherein the anchor member, the torsion member, the latch post and the arm are molded from a polyester elastomer.

18. An appendage for combination with a fishhook, said fishhook having an elongated shank with a bight at one end and an eye at its other end, comprising:
   (a) an anchor member rigidly attached to the shank near the eye thereof;
   (b) a pair of independently operable torsion members extending radially outwardly from the anchor member, with said torsion members lying on opposite sides of the shank and in a plane which is approximately perpendicular to the plane formed by the shank and the bight, and said plane being approximately transverse to the longitudinal axis of the shank;
   (c) a cantilevered arm permanently connected to the distal end of each of the torsion members, and each arm having a relaxed position in which it forms a substantial angle with respect to the hook's shank at such time as its associated torsion member is relaxed, and each of said arms having a cocked position in which it is much closer to the shank than in its relaxed position, with the cocked position of each arm being established by imparting torsion to its associated torsion member; and
   (d) means for temporarily holding individual ones of the two cantilevered arms in a cocked position, with said means including an element which is singularly associated with each one of the cantilevered arms, with each element being rigidly fixed to the shank at a position intermediate the torsion member and the bight of the hook, and said holding means being responsive to movement of a cantilevered arm within a fish's mouth for releasing said arm such that the potential energy in a torsion member may be recovered and an associated arm returned to its relaxed position, whereby the fish will have more difficulty in dislodging a hook with relaxed arms than it had in swallowing a hook with cocked arms.

19. The appendage as claimed in claim 18 wherein the anchor member, the torsion member, the holding means and the arm are integrally formed from a single material.

20. The appendage as claimed in claim 18 wherein the holding means and the arms are arranged such that each of the arms independently moves through an angle of at least 15 degrees but not much more than about 60 degrees as it moves from its relaxed position to its cocked position.

21. An appendage adapted for combination with a metal fishhook, with said fishhook having an elongated shank which is terminated at one end with a bight having a pointed end, and the shank being terminated at its other end with an eye, comprising:
   (a) an anchor member of thermoplastic material which is molded around the shank adjacent the eye of the fishhook;
   (b) a torsion member of thermoplastic material extending transversely from the longitudinal axis of the shank, and said torsion member having a distal end which is substantially separated from the shank, whereby a bait may be affixed along the shank without contacting said distal end;
   (c) a cantilevered arm of thermoplastic material connected to the distal end of the torsion member, and said arm having a relaxed position in which it forms a substantial angle with respect to the hook's shank, and said arm also having a cocked position in which it lies alongside and nearly parallel to said shank; and
   (d) structural means of thermoplastic material for temporarily holding the cantilevered arm in a cocked position, and for releasing said cantilevered arm in response to the squeezing action which results from a fish swallowing the hook and appendage, whereby the fish will have difficulty in expelling the hook when the arm is relaxed.

* * * * *